United States Patent [19]
Isobe et al.

[11] Patent Number: 5,786,848
[45] Date of Patent: Jul. 28, 1998

[54] THREE-DIMENSIONAL VIDEO SIGNAL GENERATOR AND THREE-DIMENSIONAL VIDEO DISPLAY APPARATUS

[75] Inventors: Toshinobu Isobe, Chiba; Yasuhiro Kawamura; Hisafumi Yamada, both of Tokyo; Hidehiko Okada, Kanagawa, all of Japan

[73] Assignee: Sony Corporation, Tokyo, Japan

[21] Appl. No.: 670,139

[22] Filed: Jun. 25, 1996

Related U.S. Application Data

[63] Continuation of Ser. No. 272,006, Jul. 7, 1994, abandoned.

[30] Foreign Application Priority Data

Jul. 13, 1993 [JP] Japan .................................. 5-173165

[51] Int. Cl.⁶ .................................................. H04N 7/18
[52] U.S. Cl. .................................................. 348/51; 348/43
[58] Field of Search .................................. 348/42, 43, 47, 348/49, 51, 56, 207, 388, 389, 409, 415, 424, 429, 434, 438, 470, 556, 607, 608, 630; H04N 7/18

[56] References Cited

U.S. PATENT DOCUMENTS

| | | | |
|---|---|---|---|
| 4,523,226 | 6/1985 | Lipton et al. | 348/42 |
| 4,562,463 | 12/1985 | Lipton | 348/51 |
| 4,583,117 | 4/1986 | Lipton et al. | 348/47 |
| 4,942,466 | 7/1990 | Sandbank et al. | 348/429 |
| 5,128,747 | 7/1992 | Isnardi et al. | 348/470 |
| 5,128,759 | 7/1992 | Matsunaga | 348/424 |
| 5,148,270 | 9/1992 | Someya | 348/388 |
| 5,179,443 | 1/1993 | Sugimori et al. | 348/434 |
| 5,325,125 | 6/1994 | Naimpally et al. | 348/608 |
| 5,353,065 | 10/1994 | Katsumata et al. | 348/389 |
| 5,369,448 | 11/1994 | Lee | 348/630 |

*Primary Examiner*—Richard Lee
*Attorney, Agent, or Firm*—Limbach & Limbach L.L.P.

[57] ABSTRACT

A three-dimensional video signal generator has a high-definition video signal source for generating left and right high-definition video signals having, as left and right video signals, video signals in respective effective scanning periods of odd-numbered and even-numbered field signals of a interlaced-scanning high-definition video signal composed of 1125 scanning lines and having an interlace factor of 2:1. The left and right video signals in the respective effective scanning periods of the left and right high-definition video signals supplied from said high-definition video signal source are vertically compressed in time with a compression ratio of 11:5. The compressed left and right video signals in the odd-numbered and even-numbered fields are combined into a three-dimensional video signal disposed in each of effective scanning periods of odd-numbered and even-numbered field signals of one high-definition video signal, with a pseudo vertical blanking period of a given time duration inserted between the compressed left and right video signals such that the time interval of the compressed left and right video signals becomes a ½ field period.

4 Claims, 11 Drawing Sheets

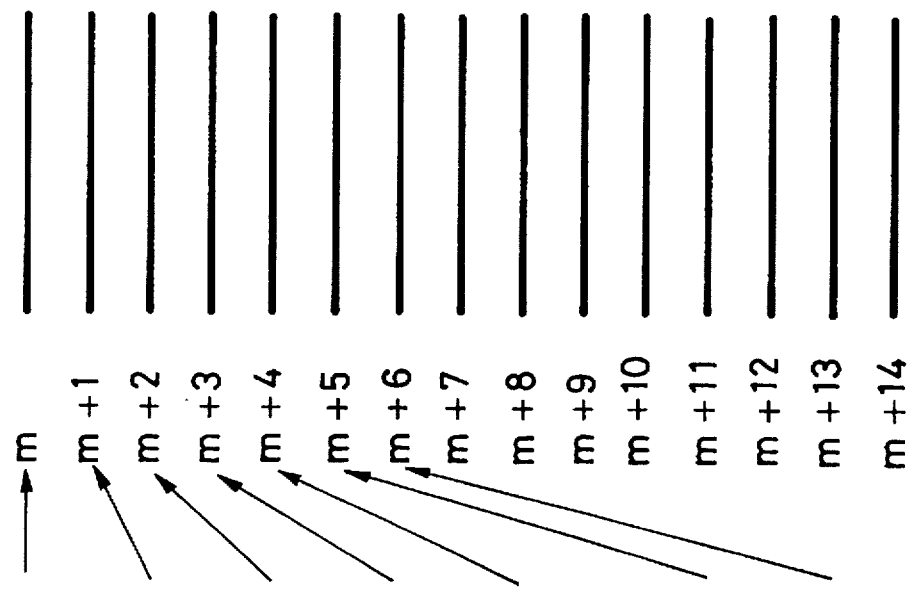
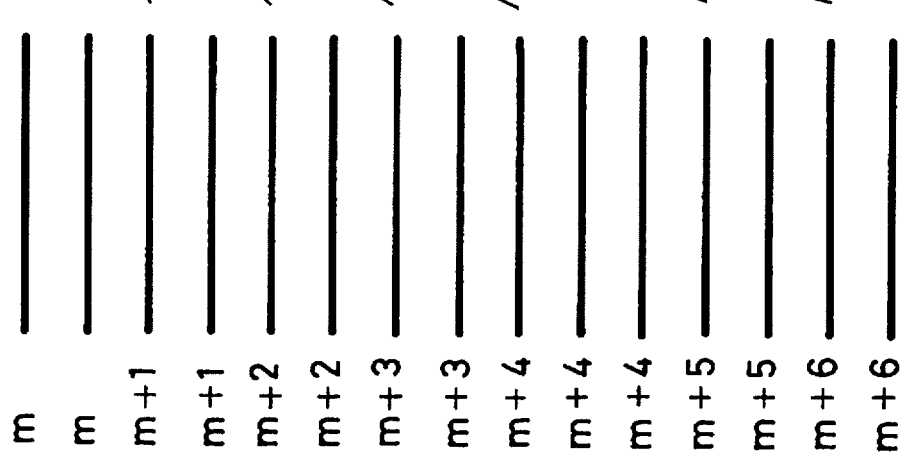
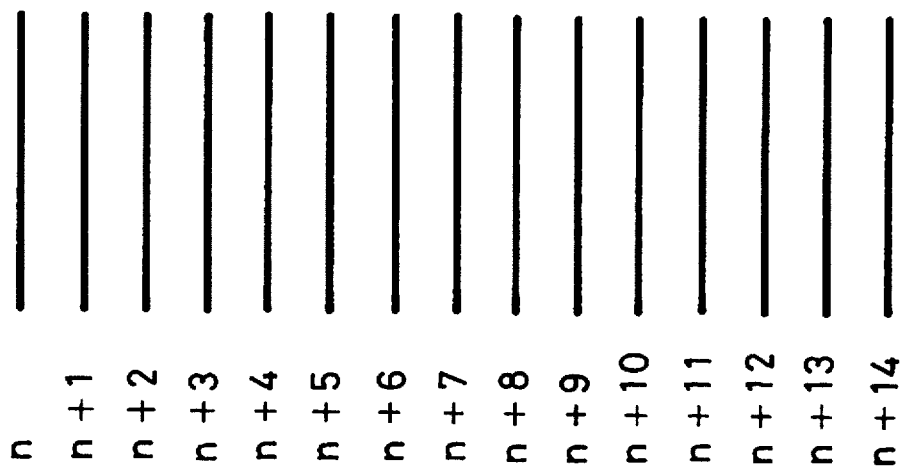

THREE-DIMENSIONAL VIDEO SIGNAL GENERATOR AND THREE-DIMENSIONAL VIDEO DISPLAY APPARATUS

This is a continuation of application Ser. No. 08/272,006 filed on Jul. 7, 1994 now abandoned.

BACKGROUND OF THE INVENTION

The present invention relates to a three-dimensional video signal generator and a three-dimensional video display apparatus.

U.S. Pat. No. 4,523,226 discloses a three-dimensional television system for displaying three-dimensional images. In the disclosed three-dimensional television system, the effective scanning periods of left- and right-field video signals are vertically compressed to ½, with a pseudo blanking period inserted therebetween which includes a pseudo vertical synchronizing signal, producing respective odd- and even-numbered-field video signals of a television signal. Such a television signal is transmitted to a cathode-ray tube, and the electron beam in the cathode-ray tube is vertically deflected at a frequency which is twice the normal vertical deflection frequency. The viewer views the screen of the cathode-ray tube with glasses whose shutters are alternately opened and closed at the normal vertical deflection frequency, so that the user can see the displayed video image as a three-dimensional image.

The conventional three-dimensional television system, however, suffers the following drawbacks: Since the effective scanning periods of left- and right-field video signals are vertically compressed to ½, with a pseudo blanking period inserted therebetween which includes a pseudo vertical synchronizing signal, producing respective, odd-numbered and even-numbered field video signals, end and beginning portions of the left- and right-field video signals are lost for the blanking period. Furthermore, because the pseudo vertical synchronizing signal is inserted in the pseudo blanking period, it is impossible to distinguish between the pseudo vertical synchronizing signal and the original vertical synchronizing signal when the video signal is received. Another problem is that the left and right video images are shifted by H/4 when the video signal is received.

SUMMARY OF THE INVENTION

It is therefore an object of the present invention to provide a three-dimensional video signal generator for generating a three-dimensional video signal without losing portions of left and right video signals and also without the need for inserting a pseudo vertical synchronizing signal, and a three-dimensional video display apparatus for displaying a three-dimensional video image composed of left and right video images in response to such a three-dimensional video signal.

According to the present invention, there is provided a three-dimensional video signal generator comprising a high-definition video signal source for generating left and right high-definition video signals having, as left and right video signals, video signals in respective effective scanning periods of odd-numbered and even-numbered field signals of a interlaced-scanning high-definition video signal composed of 1125 scanning lines and having an interlace factor of 2:1, left and right video signal compressing means for vertically compressing in time, with a compression ratio of 11:5, the left and right video signals in the respective effective scanning periods of the left and right high-definition video signals supplied from the high-definition video signal source, and combining means for combining the compressed left and right video signals in the odd-numbered and even-numbered fields from the left and right video signal compressing means into a three-dimensional video signal disposed in each of effective scanning periods of odd-numbered and even-numbered field signals of one high-definition video signal, with a pseudo vertical blanking period of a given time duration inserted between the compressed left and right video signals such that the time interval of the compressed left and right video signals becomes a ½ field period.

The left and right high-definition video signals from the high-definition video signal source are vertically compressed in time with a compression ratio of 11:5 by the left and right video signal compressing means, and then combined by the combining means into a three-dimensional video signal disposed in each of effective scanning periods of odd-numbered and even-numbered field signals of one high-definition video signal, with a pseudo vertical blanking period of a given time duration inserted between the compressed left and right video signals such that the time interval of the compressed left and right video signals becomes a ½ field period.

The three-dimensional, video signal generator further comprises left and right vertical low-pass filters for being supplied with the left and video signals in the effective scanning periods of the left and right high-definition video signals supplied from the high-definition video signal source to the left and right video signal compressing means to remove aliasing noise from the supplied left and right video signals.

The left and video signals in the effective scanning periods of the left and right high-definition video signals supplied from the high-definition video signal source to the left and right video signal compressing means, and supplied to the vertical low-pass filters to remove aliasing noise therefrom.

According to the present invention, there is also provided a three-dimensional video display apparatus comprising display means for displaying a three-dimensional image in response to a three-dimensional video signal composed of left and right video signals vertically compressed with a compression ratio of 15:5 and corresponding to video signals in respective effective scanning periods of odd-numbered and even-numbered field signals of the high-definition video signal which has 1125 interlaced scanning lines with an interlace factor of 2:1, and combined into the three-dimensional video signal disposed in each of the effective scanning periods of odd-numbered and even-numbered field signals of one high-definition video signal, with a pseudo vertical blanking period of a given time duration inserted between the compressed left and right video signals such that the time interval of the compressed left and right video signals becomes a ½ field period, and expanding means for vertically expanding the three-dimensional video signal twice in time.

The three-dimensional video signal supplied to the displaying means is vertically expanded twice in time by the expanding means.

According to the present invention, there is further provided a three-dimensional video display apparatus comprising display means for displaying a three-dimensional image in response to a three-dimensional video signal composed of left and right video signals vertically compressed with a compression ratio of 15:5 and corresponding to video signals in respective effective scanning periods of odd-numbered and even-numbered field signals of the high-definition video signal which has 1125 interlaced scanning lines with an interlace factor of 2:1, and combined into the three-dimensional video signal disposed in each of the effective scanning periods of odd-numbered and even-numbered field signals of one high-definition video signal, with a pseudo vertical blanking period of a given time duration inserted between the compressed left and right video signals such that the time interval of the compressed left and right video signals becomes a ½ field period, vertical synchronizing signal generating means responsive to horizontal and vertical synchronizing signals separated from the three-dimensional video signal, for generating a vertical synchronizing signal having a frequency which is twice the vertical frequency of the three-dimensional video signal, and scanning means responsive to the horizontal synchronizing signal separated from the three-dimensional video signal and the vertical synchronizing signal from the vertical synchronizing signal generating means, for displaying, on the display means, interlaced scanning left and right images having an interlace factor of 4:2 based on the three-dimensional video signal with a horizontal scanning frequency equal to the horizontal frequency of the three-dimensional video signal and a vertical scanning frequency which is twice the vertical frequency of the three-dimensional video signal.

Responsive to horizontal and vertical synchronizing signals separated from the three-dimensional video signal, a vertical synchronizing signal having a frequency which is twice the vertical frequency of the three-dimensional video signal is generated by the vertical synchronizing signal generating means. Responsive to the horizontal synchronizing signal separated from the three-dimensional video signal and the vertical synchronizing signal from the vertical synchronizing signal generating means, interlaced scanning left and right images having an interlace factor of 4:2 based on the three-dimensional video signal with a horizontal scanning frequency equal to the horizontal frequency of the three-dimensional video signal and a vertical scanning frequency which is twice the vertical frequency of the three-dimensional video signal are displayed on the display means by the scanning means.

BRIEF DESCRIPTION OF THE DRAWINGS

FIGS. 5A, 5B, and 5C are diagrams of scanning lines illustrative of the manner in which the compressing/combining circuit shown in FIG. 3 operates;

DETAILED DESCRIPTION OF THE PREFERRED EMBODIMENT

A three-dimensional video signal generator and a three-dimensional video display apparatus according to the present invention will be described below with respect to a 1125/60 high-definition television system. The 1125/60 high-definition television system has video and synchronizing signals whose basic characteristics are as follows: The number of scanning lines per frame is 1125, and the effective number of scanning lines per frame is 1035. The interlace factor is 2:1, and the aspect ratio is 16:9. The field frequency (vertical frequency) is 60 Hz, the line frequency (horizontal frequency) is 33.75 kHz, and the vertical blanking width is 45 lines.

Figure 1:
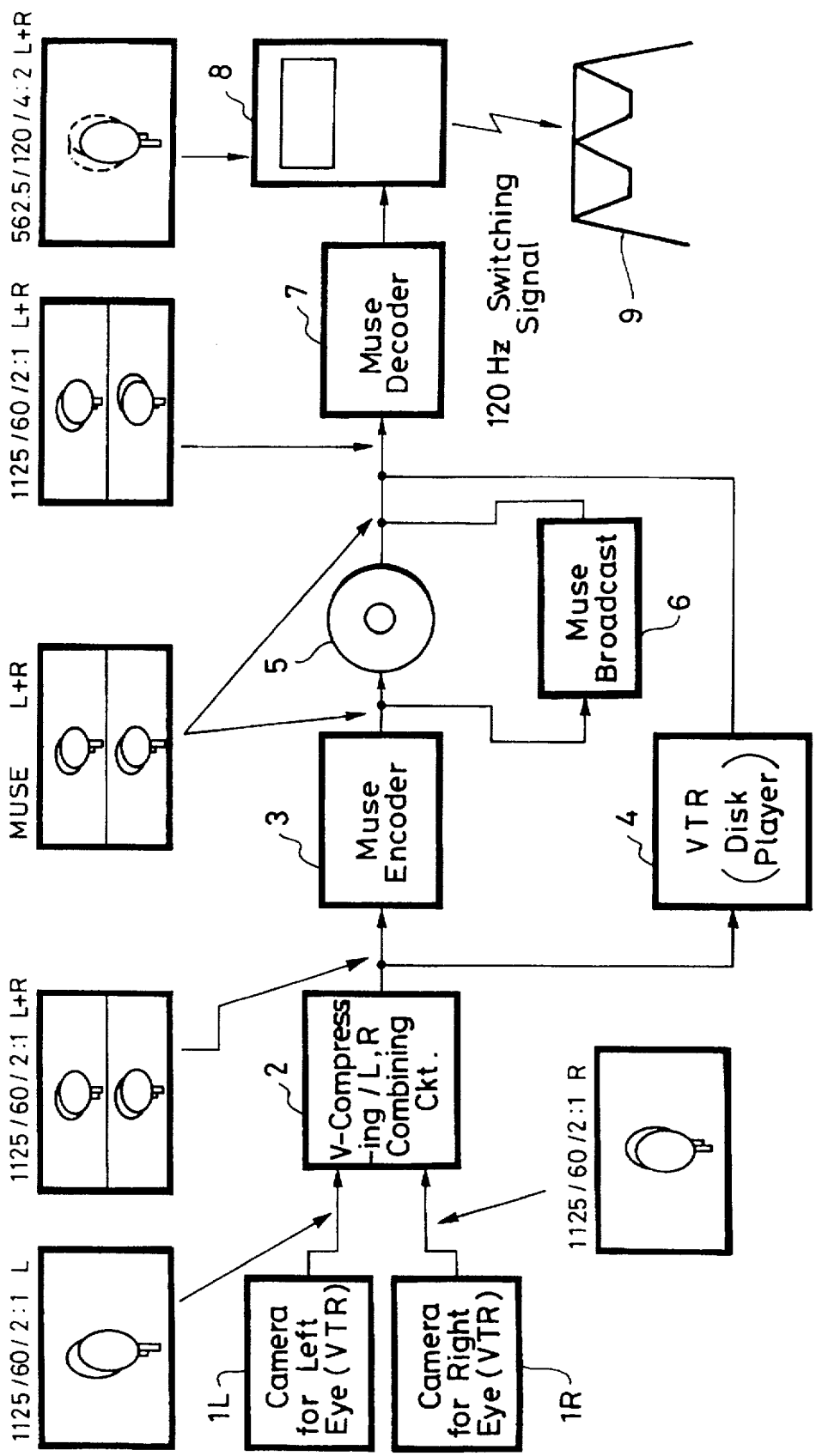
FIG. 1 is a block diagram of a three-dimensional video display apparatus according to the present invention.

The three-dimensional video display apparatus will be described below with reference to FIG. 1. The image of a subject is taken by a high-definition television camera 1L for a left eye and a high-definition television camera 1R for a right eye, and left and right composite high-definition video signals from these television cameras 1L, 1R are supplied to a vertical compressing/left and right video signal combining circuit 2. The vertical compressing/left and right video signal combining circuit 2 vertically compresses, with a compression ratio of 15:5, left and right video signals corresponding to video signals in the respective effective scanning periods of odd-numbered and even-numbered field signals of a high-definition video signal which has 1125 interlaced scanning lines with the interlace factor of 2:1, and combines the compressed left and right video signals into a composite three-dimensional color television signal disposed in each of the effective scanning periods of odd-numbered and even-numbered field signals of one high-definition video signal, with a pseudo vertical blanking period of a certain time duration inserted between the compressed left and right video signals such that the time interval of the compressed left and right video signals becomes a ½ field period. The high-definition television cameras 1L, 1R may be replaced with video tape recorders (VTRs) which have recorded left and right composite high-definition video signals.

The composite three-dimensional color television signal generated by the vertical compressing/left and right video signal combining circuit 2 is supplied to a multiple-sub-Nyquist-sampling-encoding (MUSE) encoder 3, which modulates the supplied composite three-dimensional color television signal into a MUSE television signal. The MUSE television signal is supplied through a MUSE video disc (laser disc) 5 or a MUSE broadcast 6 to a MUSE decoder 7. Alternatively, the composite three-dimensional color television signal is recorded and reproduced by a VTR or disc player 4, and supplied to MUSE decoder 7. The decoded television signal from the MUSE decoder 7 is then supplied to a television receiver 8. In the television receiver 8, the horizontal deflection frequency of the television signal remains at 33.75 kHz, but the vertical deflection frequency is switched to 60 Hz×2=120 Hz. Therefore, the left and right video signals are displayed on the cathode-ray tube (CRT) of the television receiver 8 at an interlace factor of 4:2. The viewer sees left and right video images each having an interface factor of 2:1 with his respective left and right eyes, using glasses 9 having respective liquid crystal shutters which are alternately opened and closed at a frequency of 60 Hz in synchronism with the vertical deflection frequency of 120 Hz.

Figure 2:
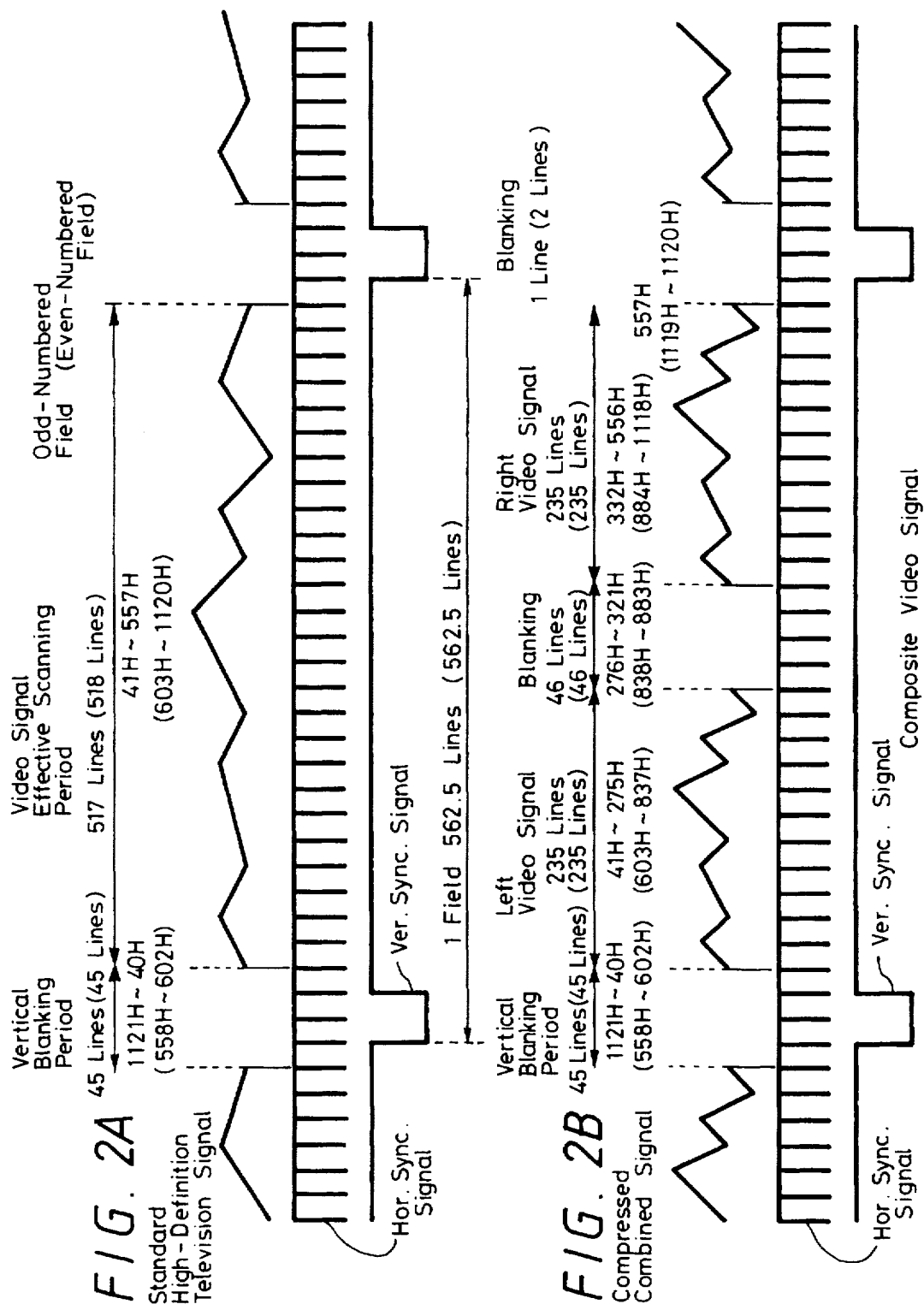
FIGS. 2A and 2B are diagrams showing a composite video signal of a standard high-definition television signal and a composite video signal composed of left and right video signals which are compressed and combined with other.

The process of vertically compressing the left and right video signals and combining the compressed left and right video signals in the vertical compressing/left and right video signal combining circuit 2 will be described below with reference to FIGS. 2A and 2B. FIG. 2A shows a composite video signal of a standard high-definition television signal, and FIG. 2B shows a composite video signal composed of left and right video signals which are compressed and combined with other according to the embodiment. In FIGS. 2A and 2B, numerals in parentheses represent those in even-numbered fields, and numerals without parentheses represent those in odd-numbered fields.

First, the composite video signal of a standard high-definition television signal shown in FIG. 2A will be described below. The number of scanning lines in the vertical blanking period in each of odd-numbered and even-numbered fields is 45 [1121H–40H (558H–602H)], the number of scanning lines in the effective scanning period of the video signal in an odd-numbered field is 517 (41H–557H), and the number of scanning lines in the effective scanning period of the video signal in an even-numbered field is 518 (603H–1120H).

The composite video signal of a compressed combined signal shown in FIG. 2B will be described below. As with the standard high-definition television signal, the number of scanning lines in the vertical blanking period in each of odd-numbered and even-numbered fields is 45 [1121H–40H (558H–602H)]. The numbers 517, 518 of scanning lines in the effective scanning periods of the left and right video signals in odd-numbered and even-numbered fields are compressed into the number 235 of scanning lines by being multiplied by 5/11. The product produced by multiplying 517 by 5 can be divided by 11, but the product produced by multiplying 518 by 5 cannot be divided by 11. Actually, therefore, 518 is multiplied by 5/11 with the remainder 1 being absorbed by a blanking period described below. The compressed left and right video signals are then successively arranged in the order named which are spaced from each other by the blanking period corresponding to 46 scanning lines, in the effective scanning lines in odd-numbered and even-numbered fields, and pseudo blanking periods corresponding to 1 and 2 scanning periods are inserted respectively in odd-numbered and even-numbered fields following the compressed right video signal. In an odd-numbered field, therefore, the compressed left video signal is positioned in 41H–275H, the pseudo blanking period in 276H–321H, the compressed right video signal in 332H–556H, and finally the blanking period in 557H. In an even-numbered field, the compressed left video signal is positioned in 603H–837H, the pseudo blanking period in 838H–883H, the compressed right video signal in 884H–1118H, and finally the blanking period in 1119H–1120H.

In odd-numbered and even-numbered fields, the interval of each of the compressed left and right video signals is set to 281H (=562H/2). Therefore, as described later on, the images of the left and right video signals can be displayed at an interlace factor of 4:2 on the CRT screen of the television receiver 8 by setting the vertical deflection period of the deflecting circuit to ½ of a standard vertical deflection period, i.e., setting the vertical deflection frequency to 120 Hz which is twice the standard vertical deflection frequency.

Figure 3:
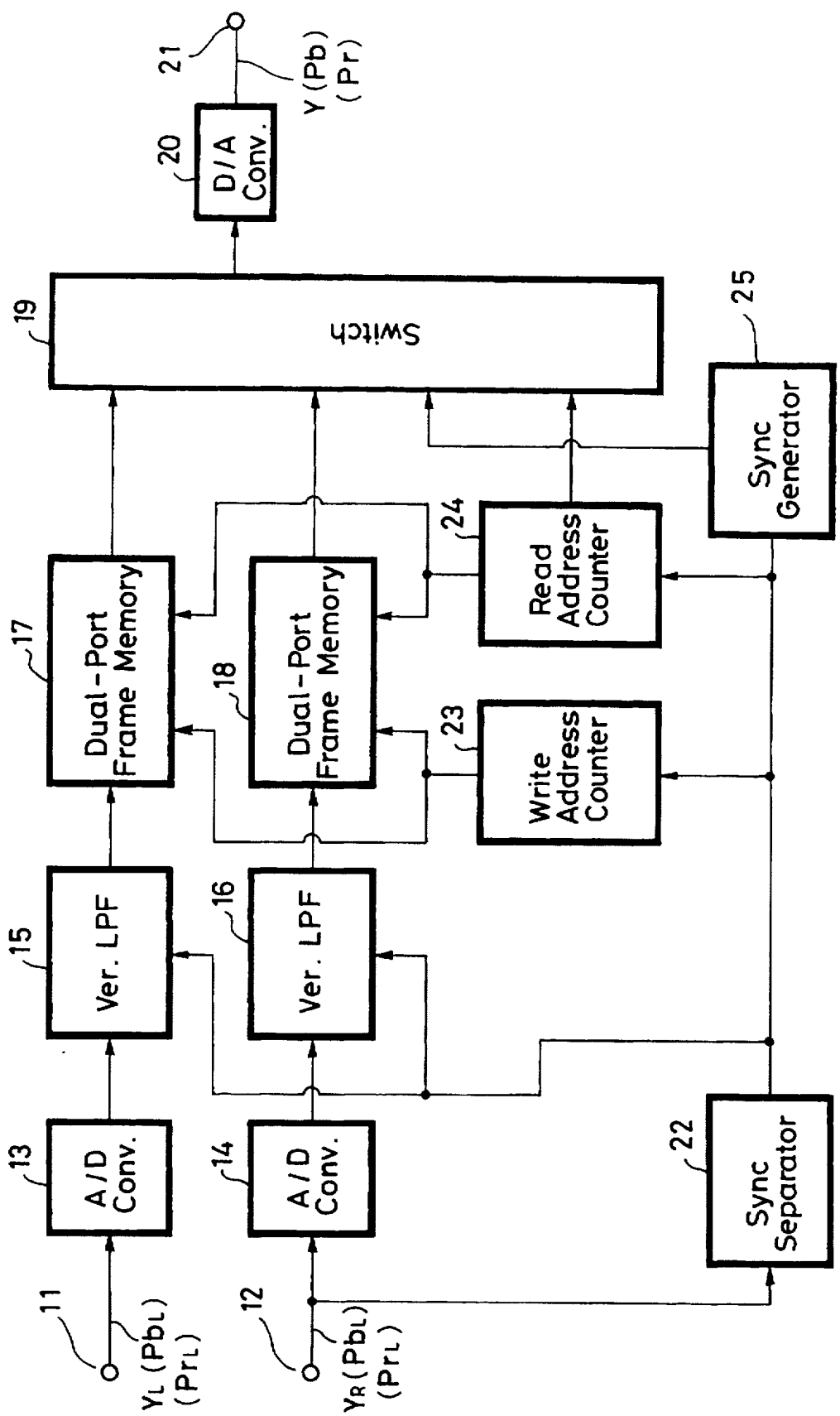
FIG. 3 is a block diagram of a compressing/combining circuit of the three-dimensional video display apparatus shown in FIG. 1.

A specific arrangement of the vertical compressing/left and right video signal combining circuit 2 shown in FIG. 1 will be described below with reference to FIG. 3. Left and right luminance signals $Y_L$, $Y_R$ and two types of left and right color difference signals $Pb_L$, $Pb_R$; $Pr_L$, $Pr_R$ of the high-definition composite left and right color video signals from the television cameras 1L, 1R are compressed and combined respectively by vertical compressing/left and right video signal combining circuits which are identical in structure to each other except for a synchronizing signal separator and a synchronizing signal generator. Specifically, the Left and right luminance signals $Y_L$, $Y_R$ and two types of left and right color difference signals $Pb_L$, $Pb_R$; $Pr_L$, $Pr_R$ of the high-definition video signals are supplied from respective input terminals 11, 12 to respective analog-to-digital (A/D) converters 13, 14, which convert the supplied signals into digital signals. The digital signals are then supplied to respective vertical low-pass filters 15, 16 to prevent vertical aliasing noise from being caused.

Figure 4:
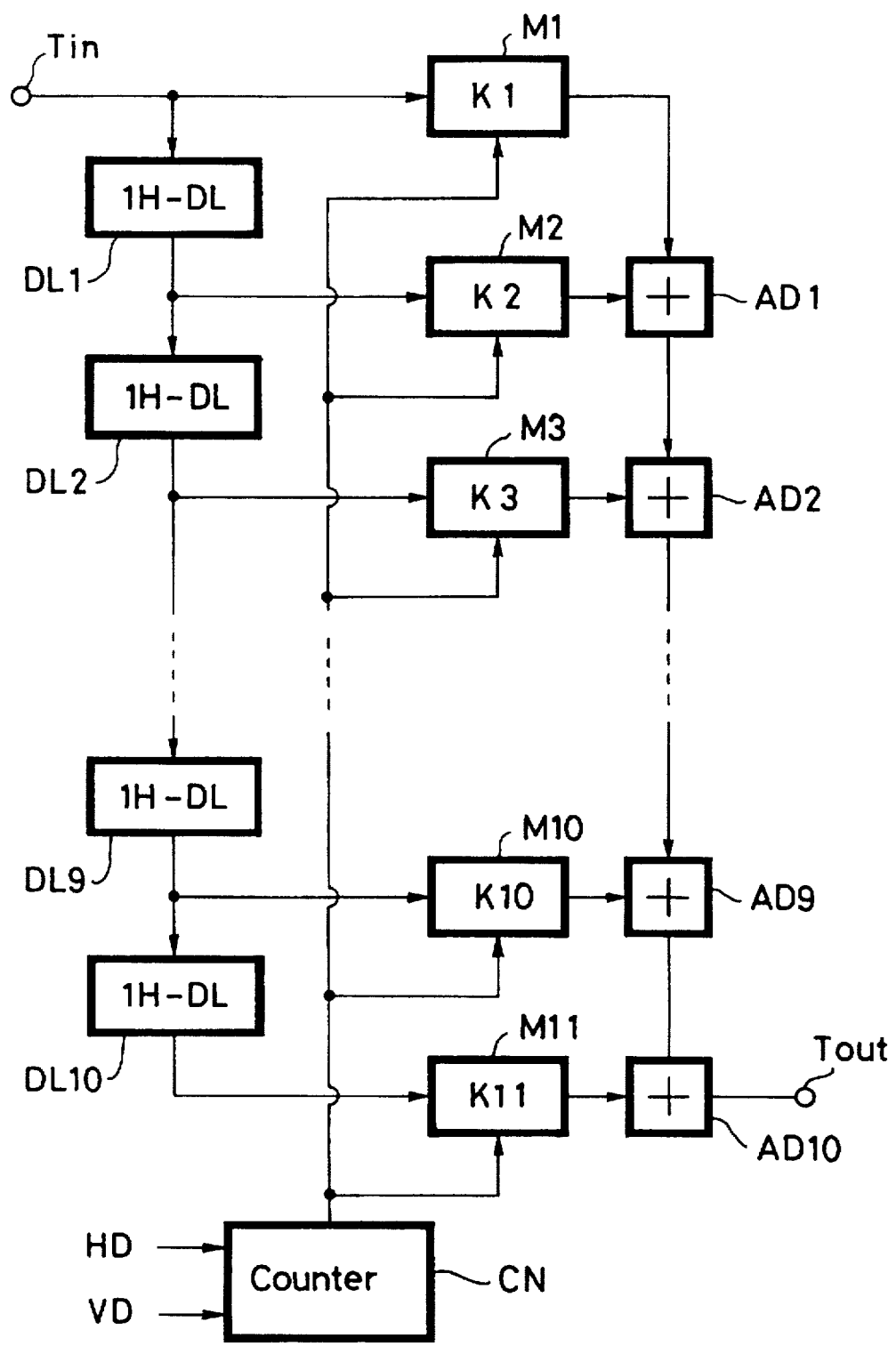
FIG. 4 is a block diagram of each of two vertical low-pass filters in the compressing/combining circuit shown in FIG. 3.

Each of the vertical low-pass filters 15, 16 comprises an 11th-order filter as shown in FIG. 4. In FIG. 4, an input signal from an input terminal Tin is supplied to ten cascaded one-horizontal-period delay units DL1~DL10, and the input signal from the input terminal Tin and output signals from the one-horizontal-period delay units DL1~DL10 are multiplied by coefficients K1~K11 in respective coefficient multipliers M1~M11. Product output signals from the coefficient multipliers M1~M11 are supplied to respective adders AD1~AD10, which produce added signals that are outputted from output terminal Tout as left and right luminance signals $Y_L$, $Y_R$ and two types of left and right color difference signals $Pb_L$, $Pb_R$; $Pr_L$, $Pr_R$ from which aliasing noise has been removed. The coefficient multipliers M1~M11 set to coefficients matching scanning line numbers which are determined depending on count output signals from a counter CN which is supplied with a horizontal synchronizing signal HD and a vertical synchronizing signal VD. Since the compression ratio is 11:5, 11 scanning lines n~n+10 shown in FIG. 5A are converted into respective scanning lines m, m, m+1, m+1, m+2, m+2, m+3, m+3, m+4, m+4, m+4 by the vertical low-pass filters 15, 16, as shown in FIG. 5B.

As the vertical compression ratio 11:5 of the left and right video signals is a simple integral ratio, the vertical low-pass filters 15, 16 are of a relatively simple arrangement as described above. These vertical low-pass filters 15, 16 may be dispensed with.

The left and right luminance signals $Y_L$, $Y_R$ and two types of left and right color difference signals $Pb_L$, $Pb_R$; $Pr_L$, $Pr_R$ from the vertical low-pass filters 15, 16 are supplied respectively to dual-port frame memories 17, 18 (see FIG. 3). When these signals are written in and read from the dual-port frame memories 17, 18, the signals are compressed by decimation of line signals. Specifically, in the dual-port frame memories 17, 18, the positions of the output scanning lines from the vertical low-pass filters 15, 16 are converted. The dual-port frame memories 17, 18 are supplied with a write address signal from a write address counter 23 and a read address signal from a read address counter 24. The write and read address signals in the write and read address counters 23, 24 are generated based on a horizontal synchronizing signal and a color burst signal from a synchronizing signal separator 22.

Operation of the dual-port frame memories 17, 18 will be described below with reference to FIGS. 5A through 5C. The left and right luminance signals $Y_L$, $Y_R$ and two types of left and right color difference signals $Pb_L$, $Pb_R$; $Pr_L$, $Pr_R$ from the vertical low-pass filters 15, 16 are supplied respectively to the dual-port frame memories 17, 18 to change write and read addresses per line. The scanning lines m, m+1, m+2, m+3 are written every other line, and the scanning line m+4 is written every two lines. Scanning lines m~m+234 are read with 41H and 322H used as a reference. FIG. 5C shows output signals read from the dual-port frame memories 17, 18.

Referring back to FIG. 3, the left and right luminance signals $Y_L$, $Y_R$ and two types of left and right color difference signals $Pb_L$, $Pb_R$; $Pr_L$, $Pr_R$ from the dual-port frame memories 17, 18 are supplied to a switch 19 and combined thereby. Particularly, the left and right luminance signals $Y_L$, $Y_R$ are combined with horizontal and vertical synchronizing signals and a color burst signal which are supplied from a synchronizing signal generator 25. The right luminance signal $Y_R$ from the input terminal 12 is supplied to the synchronizing signal separator 22, which supplies its output signal to the write and read address counters 23, 24 concerned with the left and right luminance signals $Y_L$, $Y_R$ and two types of left and right color difference signals $Pb_L$, $Pb_R$; $Pr_L$, $Pr_R$. The switch 19 supplies a compressed and combined luminance signal (composite luminance signal) Y and two color difference signals Pb, Pr to a digital-to-analog (D/A) converter 20, which converts the supplied signals into analog signals.

Figure 6:
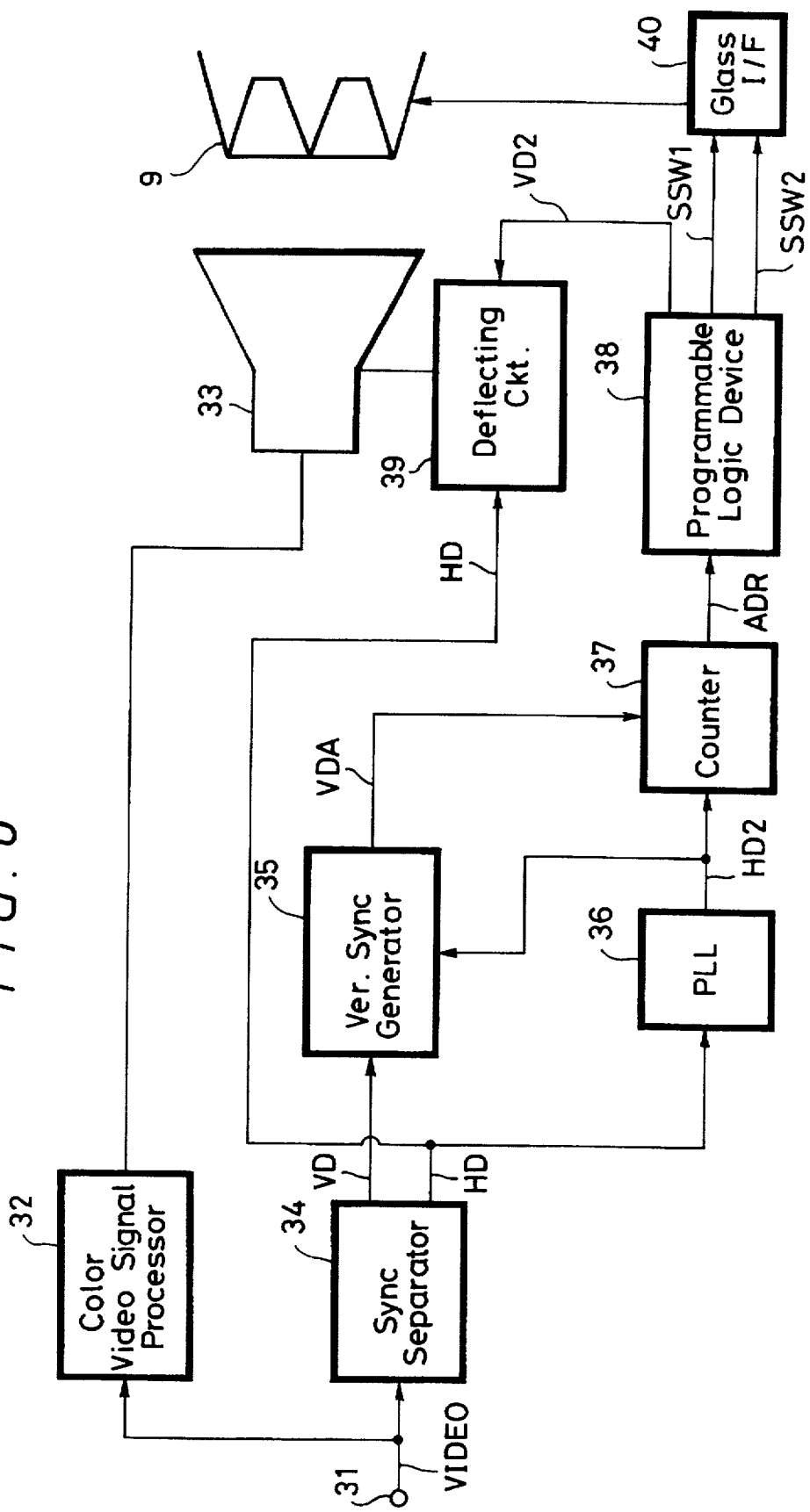
FIG. 6 is a block diagram of a television receiver of the three-dimensional video display apparatus shown in FIG. 1.
Figure 7:
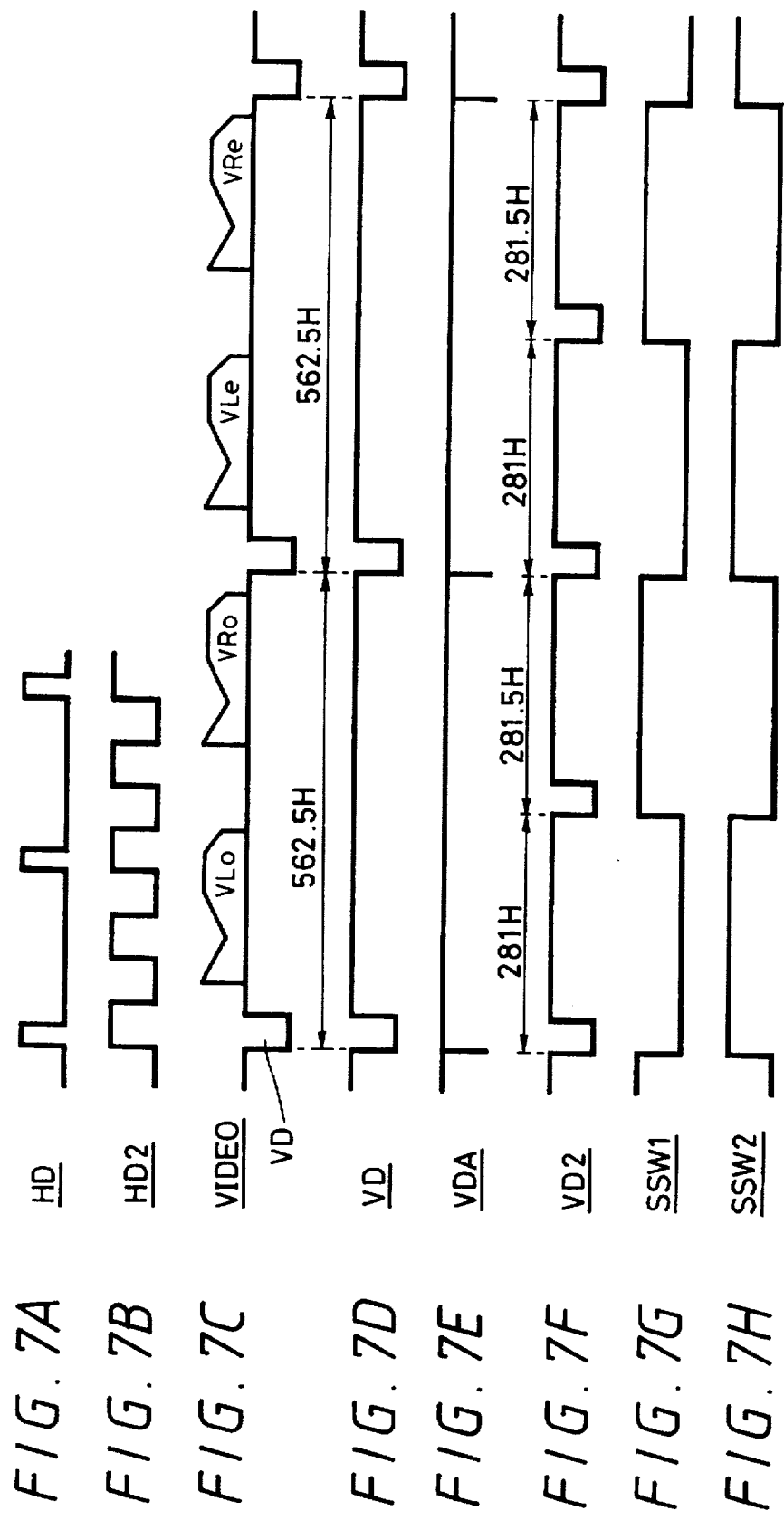
FIGS. 7A through 7H are timing charts showing signals in the television receiver shown in FIG. 6.

The television receiver 8 in the three-dimensional video display apparatus shown in FIG. 1 will be described in detail below with reference to FIG. 6. A compressed and combined composite video signal VIDEO (see FIG. 7C) and the compressed and combined luminance signal (composite luminance signal) Y and two color difference signals Pb, Pr are supplied from an input terminal 31 to a color video signal processor 32, and the luminance signal (composite luminance signal) Y is supplied to a synchronizing signal separator 34. The synchronizing signal separator 34 generates and supplies a vertical synchronizing signal VD of 60 Hz (see FIG. 7D) to a vertical synchronizing signal generator 35, which latches the supplied signal with a synchronizing signal HD2, having a frequency that is twice the horizontal frequency, from a phase-locked loop (PLL) 36, and generates a vertical synchronizing signal VDA (see FIG. 7E) that is kept in synchronism with the vertical synchronizing signal VD and having a time duration of 1/(33.75 kHz×2).

The synchronizing signal separator 34 supplies a horizontal synchronizing signal HD (FIG. 7A) to a deflecting circuit 39 associated with a CRT 33 and the PLL 36. Based on the supplied horizontal synchronizing signal HD, the PLL 36 generates a vertical synchronizing signal HD2 (FIG. 7B) having a frequency of 120 Hz, which is twice the standard vertical frequency of 60 Hz. The vertical synchronizing signal HD2 is supplied as a latching signal to the vertical synchronizing signal generator 35, and as a clock signal to an address counter 37. The address counter 37 is also supplied with the vertical synchronizing signal VDA as a reset signal. The address counter 37 operates as a modulo-1115 counter. The count output from the address counter 37 is supplied as an address signal ADR to a programmable logic device (PLD) 38, which may be replaced with a read-only memory (ROM).

The PLD 38 stores a vertical synchronizing signal VD2 (FIG. 7F) which is held in synchronism with the vertical synchronizing signal VD, has alternating periods 281H, 281.5H, and has a frequency of 120 Hz twice the vertical frequency, and also stores shutter switching control signals SSW1, SSW2 (FIGS. 7G and 7H) of 60 H which are held in synchronism with the vertical synchronizing signal VD2 and opposite in phase. In response to the address signal ADR supplied from the counter 37, the vertical synchronizing signal VD2 is read from the PLD 38 and supplied to the deflecting circuit 39, and the shutter switching control signals SSW1, SSW2 are read from the PLD 38 and supplied to a glass interface 40. The glass interface 40 then alternately opens and closes left and right liquid crystal shutters of glasses 9 at a frequency of 60 Hz. The viewer wears the glasses 9 and views left and right images displayed on the screen of the CRT 33 with his left and right eyes, respectively, through the glasses 9. Since the pseudo blanking period between the compressed left and right video signals is longer than the original vertical blanking period of 45 H, the deflecting circuit 39 of the television receiver 8 is subject to a less burden.

Figure 8:
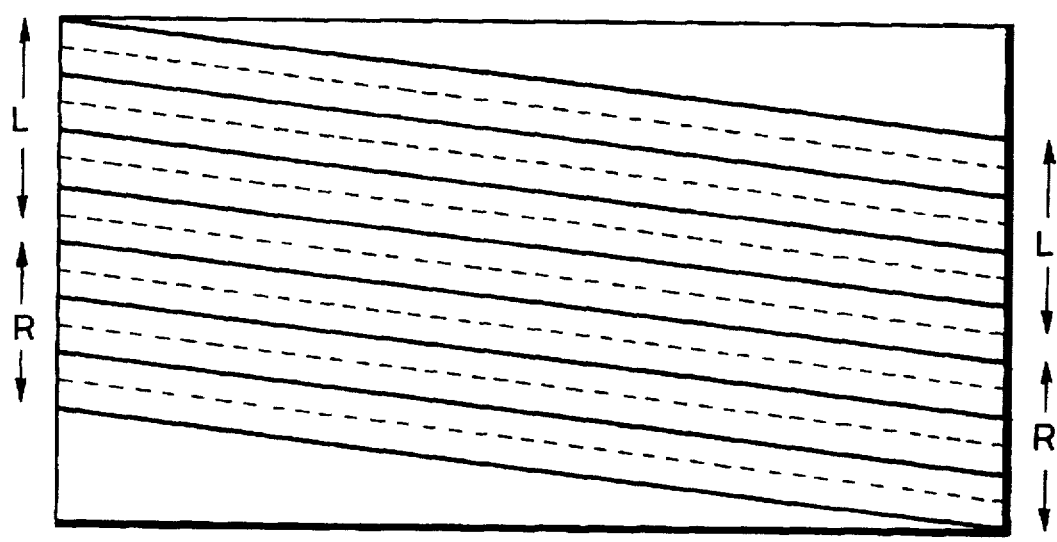
FIG. 8 is a diagram of a pattern displayed by the television receiver based on a composite signal.
Figure 9A:
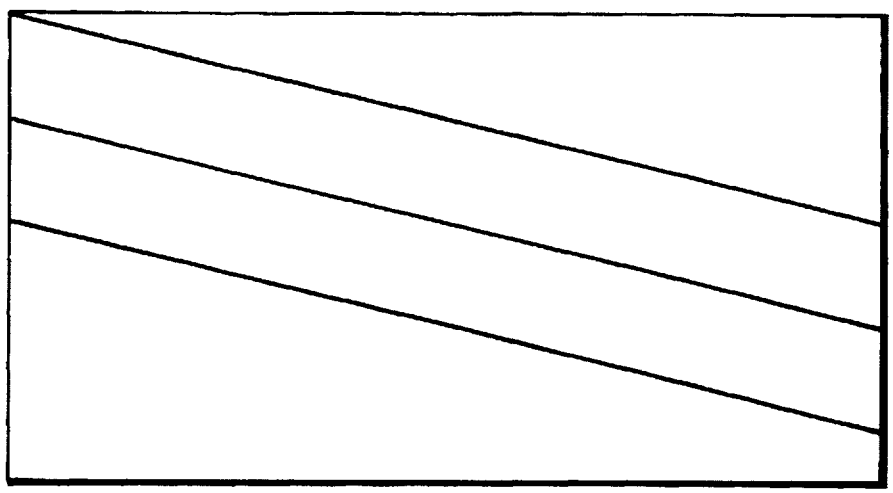
FIGS. 9A and 9B are diagrams of patterns displayed by the television receiver based on left and right video signals, respectively, in odd-numbered fields.
Figure 9B:
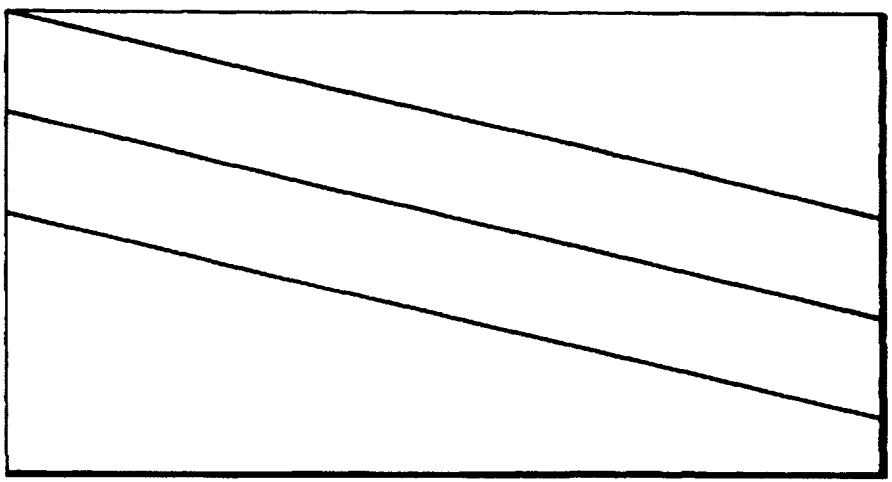
Figure 10A:
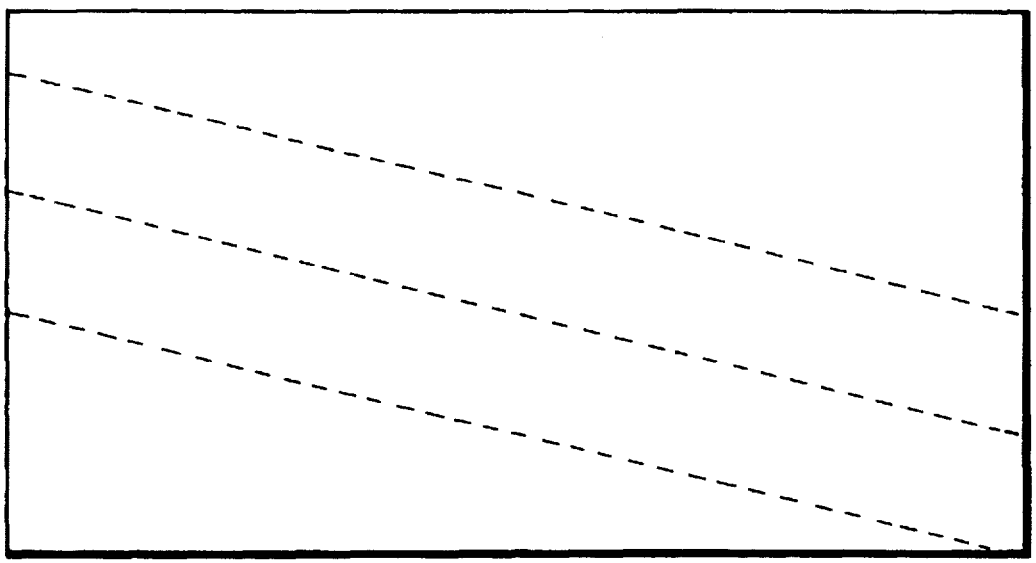
FIGS. 10A and 10B are diagrams of patterns displayed by the television receiver based on left and right video signals, respectively, in even-numbered fields.
Figure 10B:
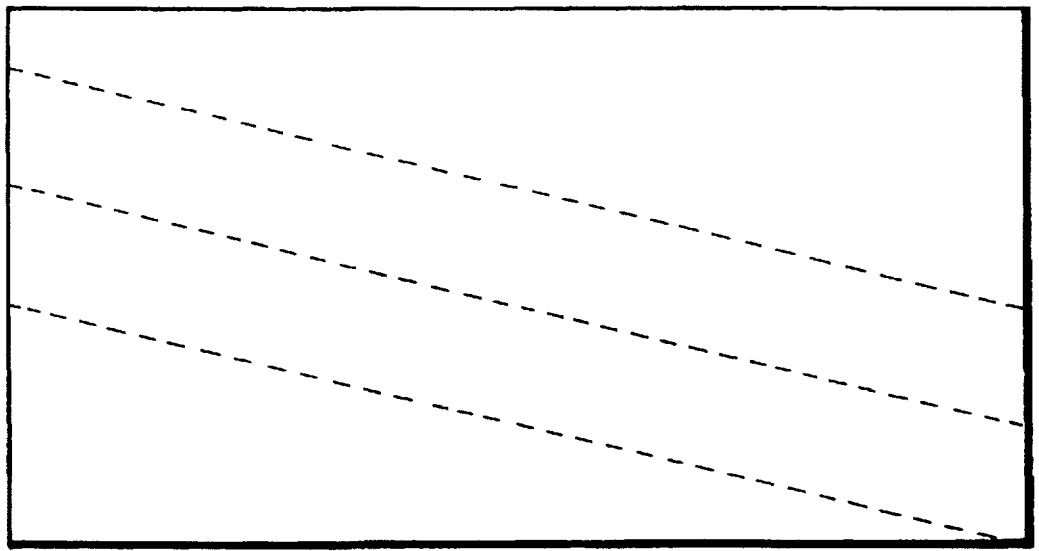
Figure 11A:
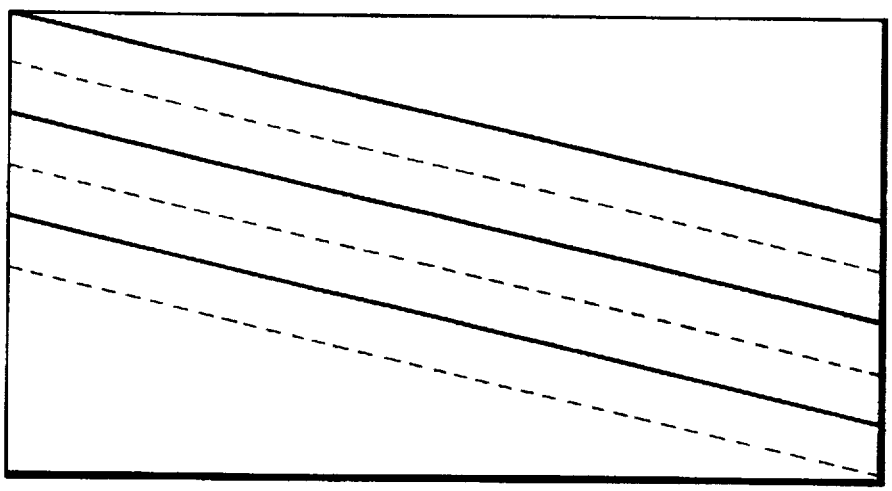
FIGS. 11A and 11B are diagrams of patterns displayed by the television receiver based on left and right interlaced video signals, respectively.
Figure 11B:
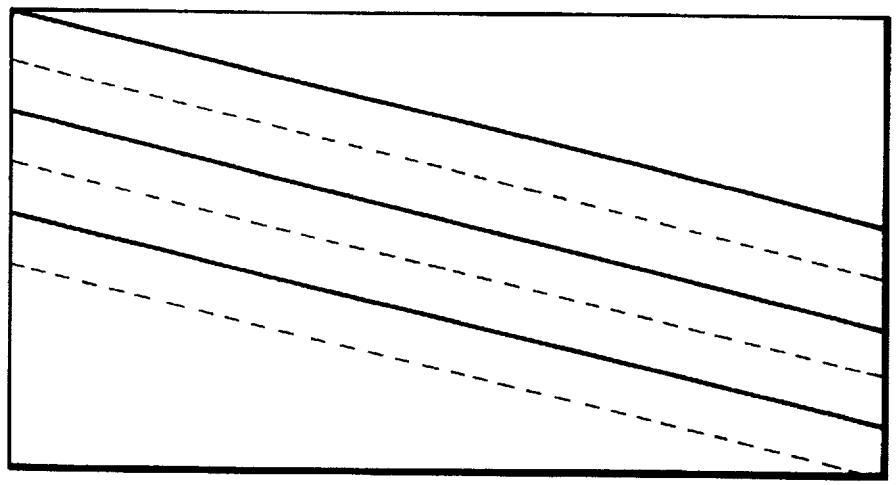

If the compressed combined video signal supplied to the CRT 33 has a vertical deflection frequency of 60 Hz, the CRT 33 displays compressed left and right images L, R of interlaced scanning having an interlace factor of 2:1 as shown in FIG. 8. If the vertical deflection frequency is increased to 120 Hz, as described above, the compressed video signal is expanded twice in the vertical direction by the deflecting circuit 39 and the CRT 33, displaying, successively in first-fourth fields, a left image in an odd-numbered field (see FIG. 9A), a right image in an odd-numbered field (see FIG. 9B), a left image in an even-numbered field (see FIG. 9C), and a right image in an even-numbered field (see FIG. 9D), i.e., left and right images of interlaced scanning having an interlace factor of 4:2, on the screen of the CRT 33. The viewer views, through the glasses 9, a left image of interlaced scanning having an interlace factor of 2:1 as shown in FIG. 11A with the left eye, and a right image of interlaced scanning having an interlace factor of 2:1 as shown in FIG. 11B with the right eye, thus seeing a three-dimensional image. The left and right images shown in FIGS. 11A and 11B are free of any vertical positional shift as well as any horizontal positional shift.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A three-dimensional high-definition video signal generator, comprising:

a high-definition video signal source for generating left and right high-definition video signals having, as left and right video signals, video signals in respective effective scanning periods of odd-numbered and even-numbered field signals of an interlaced-scanning high-definition video signal composed of multiple scanning lines and having an interlace factor of 2:1;

left and right video signal compressing means for vertically compressing in time, with a compression ratio of 11:5, the left and right video signals in the respective effective scanning periods of the left and right high-definition video signals supplied from said high-definition video signal source; and combining means for combining the compressed left and right video signals in the odd-numbered and even-numbered fields from said left and right video signal compressing means into a three-dimensional video signal disposed in each of effective scanning periods of odd- and even-numbered-field signals of one high-definition video signal, the three-dimensional video signal having a vertical blanking interval of a given time duration, the three-dimensional video signal also having a pseudo vertical blanking period of a duration greater than the given time duration inserted between the compressed left and right video signals such that a time interval of the compressed left and right video signals is a ½ field period.

2. A three-dimensional high-definition video signal generator according to claim 1, further comprising:

left and right vertical low-pass filters supplied with the left and right video signals during the effective scanning periods of the left and right high-definition video signals, the left and right vertical low-pass filters operative to remove aliasing noise from the supplied left and right video signals.

3. A three-dimensional high-definition video display apparatus, comprising:

display means for displaying a three-dimensional image in response to a three-dimensional video signal composed of left and right video signals vertically compressed with a compression ratio of 15:5 and corresponding to video signals in respective effective scanning periods of odd-numbered and even-numbered field signals of a high-definition video signal which has multiple interlaced scanning lines with an interlace factor of 2:1, and combined into the three-dimensional video signal disposed in each of the effective scanning periods of odd-numbered and even-numbered field signals of one high-definition video signal, the three-dimensional video signal having a vertical blanking interval of a given time duration, the three-dimensional video signal also having a pseudo vertical blanking period of a duration greater than the given time duration inserted between the compressed left and right video signals such that a time interval of the compressed left and right video signals is a ½ field period;

vertical synchronizing signal generating means responsive to horizontal and vertical synchronizing signals separated from said three-dimensional video signal, for generating a vertical synchronizing signal having a frequency which is twice that of a vertical frequency of the three-dimensional video signal; and expanding means for vertically expanding said three-dimensional video signal twice in time.

4. A three-dimensional high-definition video display apparatus, comprising:

display means for displaying a three-dimensional image in response to a three-dimensional video signal, the three-dimensional video signal composed of left and right video signals vertically compressed with a compression ratio of 15:5 and corresponding to video signals in respective effective scanning periods of odd-numbered and even-numbered field signals of a high-definition video signal which has multiple interlaced scanning lines with an interlace factor of 2:1, and combined into the three-dimensional video signal disposed in each of the effective scanning periods of odd-numbered and even-numbered field signals of one high-definition video signal, the three-dimensional video signal having a vertical blanking interval of a given time duration, the three-dimensional video signal also having a pseudo vertical blanking period of a duration greater than the given time duration inserted between the compressed left and right video signals such that a time interval of the compressed left and right video signals is a ½ field period;

vertical synchronizing signal generating means responsive to horizontal and vertical synchronizing signals separated from said three-dimensional video signal, for generating a vertical synchronizing signal having a frequency which is twice that of a vertical frequency of the three-dimensional video signal; and scanning means responsive to the horizontal synchronizing signal separated from said three-dimensional video signal and the vertical synchronizing signal from said vertical synchronizing signal generating means, for displaying, on said display means, interlaced scanning left and right images having an interlace factor of 4:2 based on said three-dimensional video signal with a horizontal scanning frequency equal to a horizontal frequency of the three-dimensional video signal and a vertical scanning frequency which is twice the vertical frequency of the three-dimensional video signal.

* * * * *